(12) United States Patent
Obermeier-Hartmann et al.

(10) Patent No.: US 6,824,497 B2
(45) Date of Patent: Nov. 30, 2004

(54) METHOD AND APPARATUS FOR PROLONGING THE LIFE OF A CLUTCH

(75) Inventors: Robert Obermeier-Hartmann, Büren (DE); Ulrich Blumenthal, Paderborn (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 10/262,825

(22) Filed: Oct. 2, 2002

(65) Prior Publication Data

US 2004/0067818 A1 Apr. 8, 2004

(30) Foreign Application Priority Data

Oct. 2, 2001 (DE) .......................................... 101 48 696
May 24, 2002 (DE) .......................................... 102 23 296

(51) Int. Cl.[7] .............................................. B60K 41/20
(52) U.S. Cl. .......................................... 477/184; 477/94
(58) Field of Search .................... 477/74, 95, 170–172, 477/184, 186

(56) References Cited

U.S. PATENT DOCUMENTS

| | | | | |
|---|---|---|---|---|
| 3,834,499 A | * | 9/1974 | Candellero et al. ............ | 477/73 |
| 4,928,782 A | * | 5/1990 | Sommer ...................... | 180/244 |
| 5,695,422 A | | 12/1997 | Otten | |
| 5,720,690 A | * | 2/1998 | Hara et al. ..................... | 477/20 |
| 5,839,534 A | * | 11/1998 | Chakraborty et al. ........ | 180/169 |
| 6,155,956 A | * | 12/2000 | Hayashi ....................... | 477/170 |
| 6,251,042 B1 | * | 6/2001 | Peterson et al. ............... | 477/3 |
| 6,411,881 B1 | * | 6/2002 | Thomas ....................... | 701/67 |
| 2003/0119628 A1 | * | 6/2003 | Jager et al. ................... | 477/71 |

FOREIGN PATENT DOCUMENTS

EP   0 728 962   8/1996

* cited by examiner

Primary Examiner—Roger Pang
(74) Attorney, Agent, or Firm—Husch & Eppenberger, LLC; Robert C. Haldiman

(57) ABSTRACT

The life of a clutch is prolonged via bypassing a clutch of a gearbox and engaging a machine braking system. A change in speed or direction of a gearbox output shaft is accomplished by a management controller sending a signal through a signal transmission system to bypass the clutch and engage the machine braking system. The method includes the steps of generating a signal; processing the signal by the management controller, sending a signal to bypass the clutch; and sending a signal to engage the vehicle braking system to change the speed or direction of rotation of the gearbox. Because changes of speed and/or direction of rotation of the output shaft are assisted by the machine braking system and the clutch is at least partially bypassed, it is ensured that the braking function of the starting clutch is considerably reduced or even eliminated. This leads to a considerable reduction in wear on the clutch, so that its service life can be greatly increased.

11 Claims, 5 Drawing Sheets

METHOD AND APPARATUS FOR PROLONGING THE LIFE OF A CLUTCH

CROSS REFERENCE TO RELATED APPLICATIONS

This application claims priority to German Application DE 101 48 696.0 filed on Oct. 2, 2001 and DE 102 23 296.2 filed on May 24, 2002.

1. Technical Field of the Invention

The invention relates generally to self-propelled machines and, more particularly, to a method and apparatus for prolonging the life of a clutch on such machines, especially agricultural or utility machine.

2. Description of the Related Art

EP 0 728 962 and its counterpart, U.S. Pat. No. 5,695,422, describe, inter alia, a hydrostatic-mechanical torque-divided transmission for agricultural machines, and other utility machines. To change direction of the machine the rotation of the input shaft is reduced to zero. Typically this is accomplished, at least in part, by reducing fuel feed and allowing the engine to gradually slow the rotation of the input shaft. Torque is transferred via a clutch inside the transmission. In the case of high torque transfer, this leads to both considerable heat generation in the clutch and to premature wear. To reduce heat generation and wear-related drawbacks, it is known that several clutches or braking elements can be integrated in the respective drive train. But this still leads to elevated heat generation in the drive train and has the disadvantage that a considerable number of additional assemblies are required.

The present invention is directed to overcoming one or more of the problems set forth above.

SUMMARY OF THE INVENTION

An aspect of the invention is to provide a method and an apparatus for the control of a self-propelled machine which, with little structural expenditure, minimizes wear of the drive train, reduces heat generation in the drive train, reduces the high power idle that occurs with ordinary methods for changing the direction of the machine, and/or lowers overall fuel consumption of the self-propelled machine.

Another aspect of the present invention is to control a self-propelled machine which includes a gearbox with an output shaft, a clutch, and a braking system. When a change of speed and/or direction of rotation of the output shaft is required, a management controller effects the change by at least partially bypassing the clutch and engaging the machine braking system.

When changes of speed and/or direction of rotation of the gearbox output shaft are assisted by the machine braking system, the braking function of the clutch is considerably reduced or completely excluded. This leads to a considerable reduction in wear of the clutch, so that its service life can be greatly increased, compared with known designs in the art. Also, apart from reducing the load on the clutch, a considerable reduction of engine idle power generated during deceleration is accomplished, so that the machine needs considerably less fuel, particularly in the case of changes in the direction of travel.

To not impair driving stability, it is of further advantage if associated with each land wheel or each axle of the machine are wheel brakes which are operated during changes of speed and/or direction of rotation of the gearbox output shaft.

A particularly advantageous embodiment arises if the self-propelled machine includes a traction machine and towed equipment. In this embodiment, the land wheels and/or axles of both the traction machine and the towed equipment are wheel brakes. For changes of speed and/or direction of rotation of the output shaft, the wheel brakes of both the traction machine and the towed equipment are operated. In this way, even with tractor/trailer combinations, it is ensured that, in addition to the wear-minimization of the clutch of the traction machine, high driving stability of the combination is accomplished.

To obtain high flexibility of the machine braking system in the case of changes of speed and/or direction, an advantageous embodiment includes a machine brake management system.

To obtain high driving stability independently of the driver's wish to decelerate, machine-generated input signals delivered to the management controller can be used to monitor the driving stability and achieve the inputted wish to decelerate.

In accordance with the present invention there is provided an apparatus for prolonging the life of a clutch of a self-propelled machine having a drive train including an engine, a gearbox with an output shaft, and a machine braking system; means for generating an input signal relating to a function of the drive train; a management controller for receiving the input signal, analyzing the input signal for its effect on the drive train, and generating a plurality of output signals; and means for transmitting one of the output signals to the machine braking system and another of the output signals to the clutch, and for automatically and cooperatively engaging the machine braking system and disengaging the clutch to assist a change in the speed or direction of rotation of the output shaft.

Other aspects, objects and advantages of the present invention can be obtained from a study of the drawings, the disclosure and the accompanying claims.

BRIEF DESCRIPTION OF THE DRAWINGS

Reference is now made to the drawings which illustrate the best presently known mode of carrying out the invention and wherein similar reference characters indicate the same parts throughout the views.

DETAILED DESCRIPTION

Figure 1:
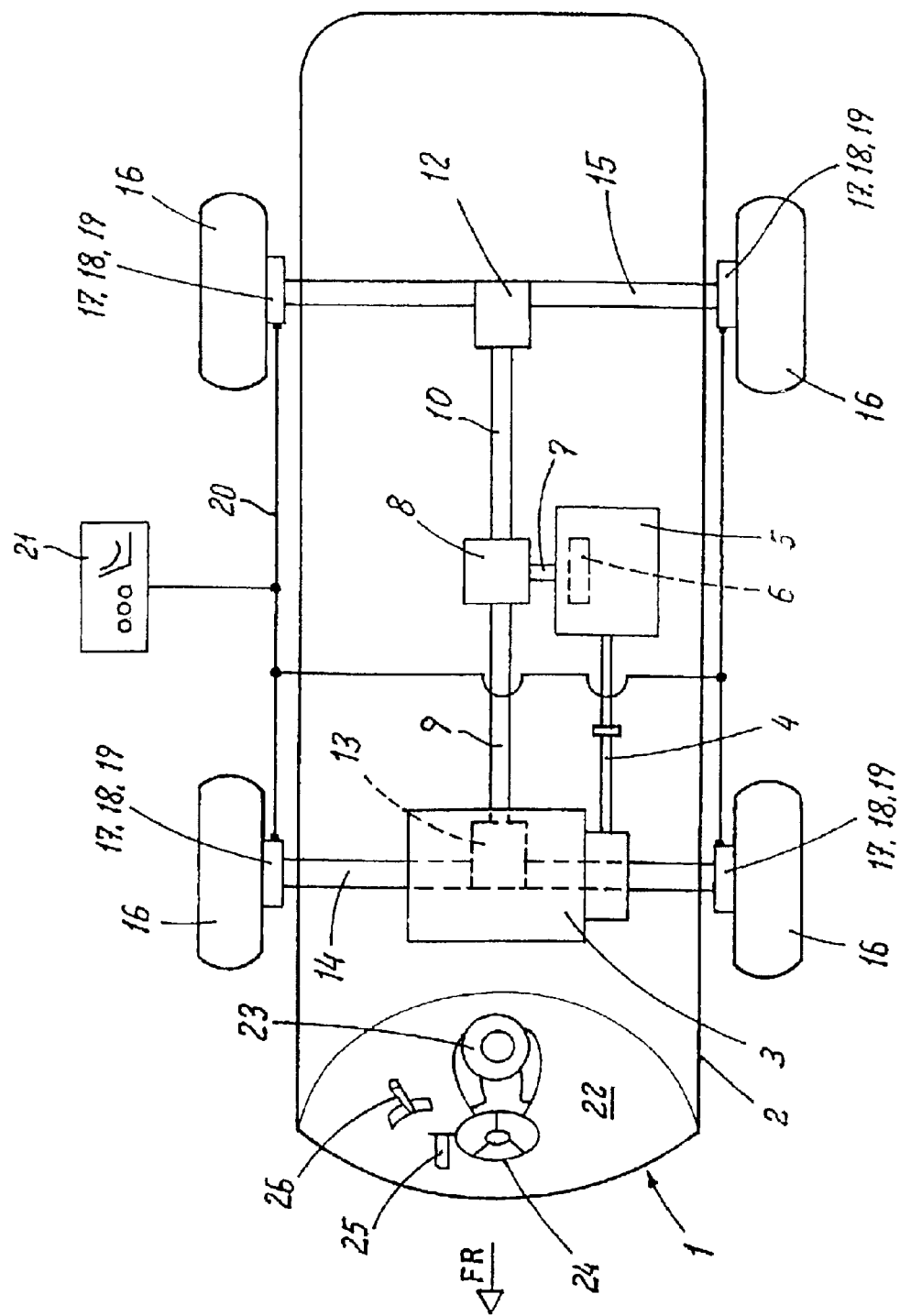
FIG. 1 is a schematic top view of a self-propelled machine with a management controller embodying the invention.

FIG. 1 shows a schematic top view of a self-propelled machine 1 having a front and a rear. The self-propelled machine 1 has a direction of travel labeled FR. The self-propelled machine 1 has a frame 2, shown only schematically, that receives a drive engine 3 which is operatively connected by energy transmitting means 4 to a gearbox 5 which will be described in more detail later, wherein the gearbox 5 receives a clutch 6, which may be a starting clutch. In the preferred embodiment, the energy transmitting means 4 is an input shaft. A first output shaft 7 of the gearbox 5 is operatively connected to a transfer gearbox 8. A first output member 9 operatively connects the transfer gearbox 8 to a first auxiliary gearbox 12, and a second output member 10 operatively connects the transfer gearbox 8 to a second auxiliary gearbox 13. In the preferred embodiment, the output members 9,10 may be intermediate shafts and the auxiliary gears 12,13 may be differential gears. While the second auxiliary gearbox 13 in front in the direction of travel FR drives a front axle 14, the first auxiliary gearbox 12 at the rear in the direction of travel FR is connected in driving relationship to a rear axle 15. Both the front axle 14 and the rear axle 15 in the embodiment shown receive at their free ends a land wheel 16 which can be braked by means of a wheel brake 17. The axles 14,15 and the wheel brake 17 may instead be associated with an alternative running system, such as a crawler track assembly. In the preferred embodiment, there is a wheel brake operatively connected to each wheel 16. The wheel brakes 17 can also be designed as a hydraulic motor 18, so that driving and braking of the wheels 16 is effected by these hydraulic motors 18 alone. On the other hand, the wheel brakes 17 shown schematically can also be gearbox-brake combinations known in the art as wheel motors 19. Also, one or more driven or freely rotatable axles 14, 15 are associated with the self-propelled machine 1. The wheel brakes 17 are connected via a first signal transmission system 20 to each other and to a management controller 21 associated with the self-propelled machine 1. The wheel brakes 17 can be associated with the land wheels 16 or only with axles 14, 15.

Particularly easy control of the braking operation arises if the driver via suitable input means can trigger a braking signal, a steering signal, a signal for determining the direction of travel and the so-called "braking via the drive train." In an operator's platform 22, a steering wheel 24, a brake pedal 25 and a ground speed control lever 26 are available to a driver 23 in a manner known in the art for control of the self-propelled machine 1. The steering wheel 24 and the brake pedal 25 each include a sensor for providing a signal. Also, mounted in the operator's platform 22 is a control switch 39, upon operation of which braking is initiated via the drive train by means of an engine brake or gearbox brake, also called a retarder, which is known in the art and therefore not described in more detail.

Figure 2:
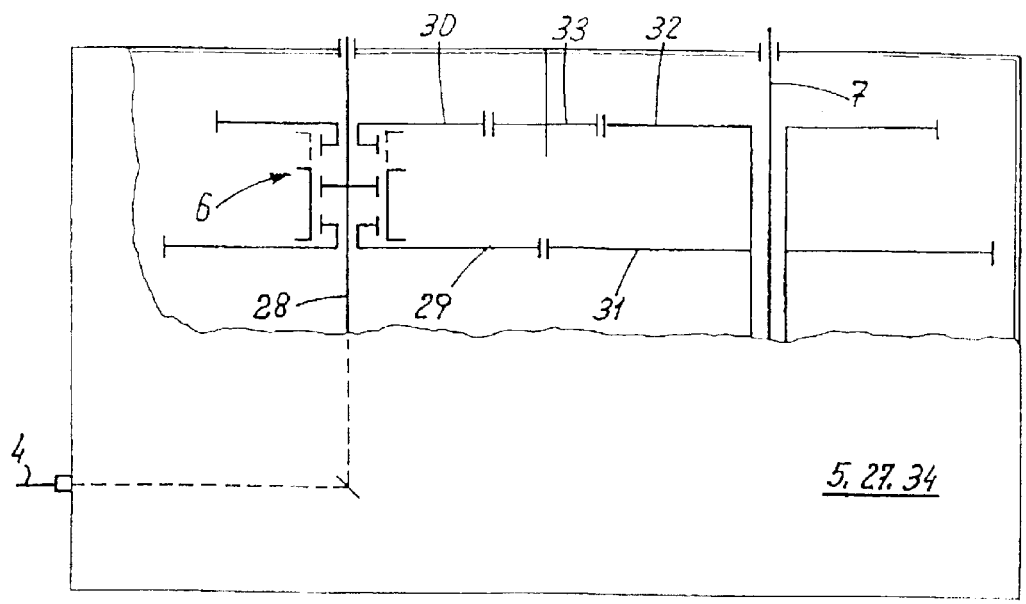
FIG. 2 is a detailed view of a transmission and clutch.

Referring now to FIG. 2, in its simplest form the gearbox 5 can be designed as a reversing gear 27, wherein the energy transmitting means 4 is operatively connected to an intermediate shaft 28. Associated with the intermediate shaft 28 are at least one first spur gear 29 and at least one second spur gear 30, wherein both spur gears 29, 30 can be non-rotatably connected via the clutch 6 alternately to the intermediate shaft 28. Likewise two spur gears, a third spur gear 31 and a fourth spur gear 32, are associated with the output shaft 7 of the reversing gear 27, which drives the wheels 16 via the transfer gearbox 8, the output members 9,10, and the axles 14,15. The third spur gear 31 meshes directly with the first spur gear 29 of the intermediate shaft 28, while the fourth spur gear 32 of the output shaft 7 is connected in driving relationship via an intermediate gear 33 for reversing the direction of rotation to the second spur gear 30 of the intermediate shaft 28. The reversing gear 27 can, for example, form part of a gearbox 5 not shown in more detail and designed as a hydrostatically/mechanically torque-divided gearbox 34.

Previously, to change the direction of travel FR of the self-propelled machine 1 from forward to reverse travel and vice versa, the clutch 6 must first release the driving connection between the spur gear 29, 30 which is non-rotatably connected to the intermediate shaft 28 at the time. In addition to the internal friction-related resistances of the drive train 3–15 and the external friction resistances of the land wheels 16 on the ground, braking of the self-propelled machine 1 to the standstill required for a change of direction of travel is effected to a considerable extent via the clutch 6. This leads, as known from the state of the art, to considerable wear on the clutch 6. Using an embodiment of the present invention, the braking function of the clutch 6 which promotes this wear can be reduced or avoided if the change of speed or direction of rotation of the output shaft 7 is assisted by a machine braking system 53. The embodiment described at least partially bypasses the clutch 6 of the gearbox 5. This further has the advantage that the driver no longer has to actuate a braking member directly, but simply the input of a wish to change direction of travel leads to automatic response of the braking system 53 by the management controller 21.

The preferred method can be employed particularly effectively with so-called off-highway machines, in particular agricultural and forestry machines which as a rule are used both for transport on the road and for use according to the intended purpose on uneven land such as fields or in the forest and are subjected to considerable changes of driving speed particularly on uneven land, depending on the load. Due to the fact that the management controller 21 can act both on the clutch and on the machine braking system associated with the respective self-propelled machine 1, reduced-load operation of the clutch 6 is accomplished.

According to the preferred embodiment, this partial bypassing of the clutch 6 is controlled by the management controller 21. This control process is shown schematically in FIGS. 3 and 4. According to FIG. 3, the control elements of steering wheel 24, ground speed control lever 26 and brake pedal 25 already described, which are integrated in the operator's platform 22 and actuatable by the driver 23, are correspondingly connected by a first, a second, and a third line system 35–37 to the management controller 21. The control switch 39 which triggers the drive train braking operation is connected by a fourth line system 38 to the management controller 21. At their simplest, the line systems 35–38 described can be designed as electrical wires that transmit to the management controller 21 electrical signals which are generated by the control elements of steering wheel 24, brake pedal 25, ground speed control lever 26, and control switch 39. This signal transmission can also be effected wirelessly, for example by radio, dispensing with the need for line systems 35–38.

Particularly easy monitoring of the driving stability of the self-propelled machine 1 and of achieving the wish to decelerate input by the driver 23 is achieved if the machine-generated input signals for the management controller 21 are the input signals of speed of the machine ("speed over land"), the speed of one or more land wheels ("wheel speed"), the measured direction of travel of the machine ("direction of travel"), or the measured position of one or more land wheels of the machine ("wheel position"). In the embodiment shown, associated with the self-propelled machine 1 in its front region is a driving speed sensor 40 that, for example, in a manner known in the art, emits a plurality of sound waves 41. The driving speed sensor 40 receives the sound waves 41 back according to the Doppler principle and determines the driving speed from the frequency variation and/or the variation in amplitude. Further, associated with at least one of the land wheels 16 and operatively connected thereto is a wheel speed sensor 42. The wheel speed sensor 42, as its name implies, determines the speed of rotation of the land wheel 16. The wheel speed sensor 42 can be associated with each of the land wheels 16. The signals generated in the driving speed sensor 40 and the wheel speed sensor 42 are transmitted to the management controller 21 via a fifth and a sixth line system 43, 44. Here too signal transmission can be effected wirelessly by radio, so that the line systems 43, 44 could be omitted. The signals transmitted by the line systems 35–38, 43, and 44 form the input signals E1–E6 of the management controller 21. The management controller 21 generates according to FIG. 3, from these input signals E1–E6, a first output signal A1 which is delivered via the first signal transmission system 20 to the wheel brakes 17 already described. Via a second signal transmission system 45, a second output signal A2 generated by the management controller 21 is transmitted to clutch 6 for triggering a shift operation in the gearbox 5. The management controller 21 can generate further output signals An, wherein the output signals A1–An can be, for example, electrical or hydraulic signals. The first signal transmission system 20, the second signal transmission system 45, and a third signal transmission system 46 required for transmission of the output signals A1–An are corresponding electrical or hydraulic signal transmission systems 20, 45, 46. With respect to the transmission of electrical output signals A1–An, the signal transmission systems 20, 45, 46 shown can be dispensed with by wireless transmission thereof.

Further associated with the self-propelled machine 1 can be a single-axle or multiple-axle towed equipment 47 having a ground drive axle 48, in a manner analogous to the self-propelled machine 1, and land wheels 16 and wheel brakes 17 cooperating therewith. The wheel brakes 17 are connected by the first signal transmission system 20 already described to the management controller 21. The wheel brakes 17 may be associated with either all the land wheels 16 or only the ground drive axle 48 and connected by the first signal transmission system 20 to the management controller 21. Also, associated with one or more of the land wheels 16 of the towed equipment 47 can be the wheel speed sensors 42, as described.

Figure 4:
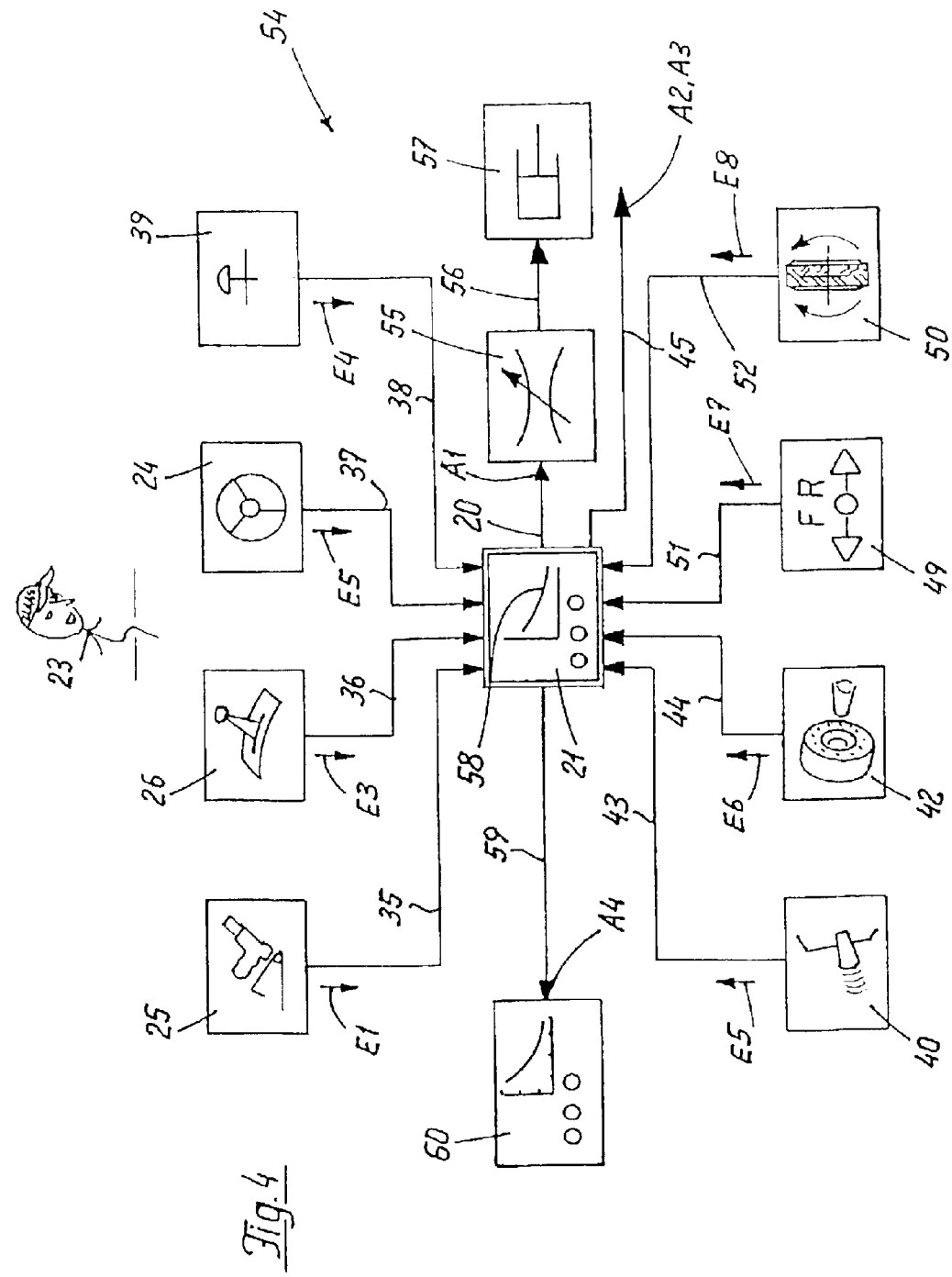
FIG. 4 is the management controller according to the invention in a block diagram.

According to the flow chart in FIG. 4, the driver 23 can actuate the control elements of brake pedal 25, steering wheel 24, ground speed control lever 26 and control switch 39 integrated in the operator's platform, so that the input signals E1–E4 generated by these control elements 24–26, 39 are driver-generated. At their simplest the input signals E1–E4 can be electrical signals which are generated in a manner known in the art by distance or angle-of-rotation sensors as well as on/off switches.

In the embodiment shown, input signal E1 embodies a braking signal ("brake") generated by the brake pedal 25, E2 embodies a steering signal ("steering lock") generated by the steering wheel 24, E3 embodies a signal ("direction of travel") generated by the ground speed control lever 26 and determining the set direction of travel (forward, reverse), and E4 embodies a signal ("brake via drive train") generated by the control switch 39 for switching on or off the engine brake and/or at least one gearbox brake.

In addition to the driving speed sensor 40, which generates a driving speed signal E5 ("speed over land"), and the wheel speed sensors 42, which generate a speed-of-rotation signal E6 ("wheel speed") for the respective land wheel 16, a direction-of-travel sensor 49 known in the art can be associated with the self-propelled machine 1 and with the towed equipment 47, and a wheel angle sensor 50 which are also known can be associated with each land wheel 16. While the direction-of-travel sensors 49 at their simplest determine the direction of rotation of the front or rear axle 14, 15 as well as of the ground drive axle 48 of the towed equipment 47 and from this measured direction of rotation generate a direction-of-travel signal E7 ("direction of travel"), the wheel angle sensors 50 determine the deflection of the land wheel 16 associated with the respective wheel angle sensor 50 and generate therefrom in each case a steering signal E8 ("wheel position"). Via a fourth signal transmission system 51 and a fifth signal transmission system 52, the direction-of-travel signal E7 and the steering signals E8 are also transmitted to the management controller 21, so that the signals E5–E8 form machine-generated input signals E5–E8 of the management controller 21.

Figure 3:
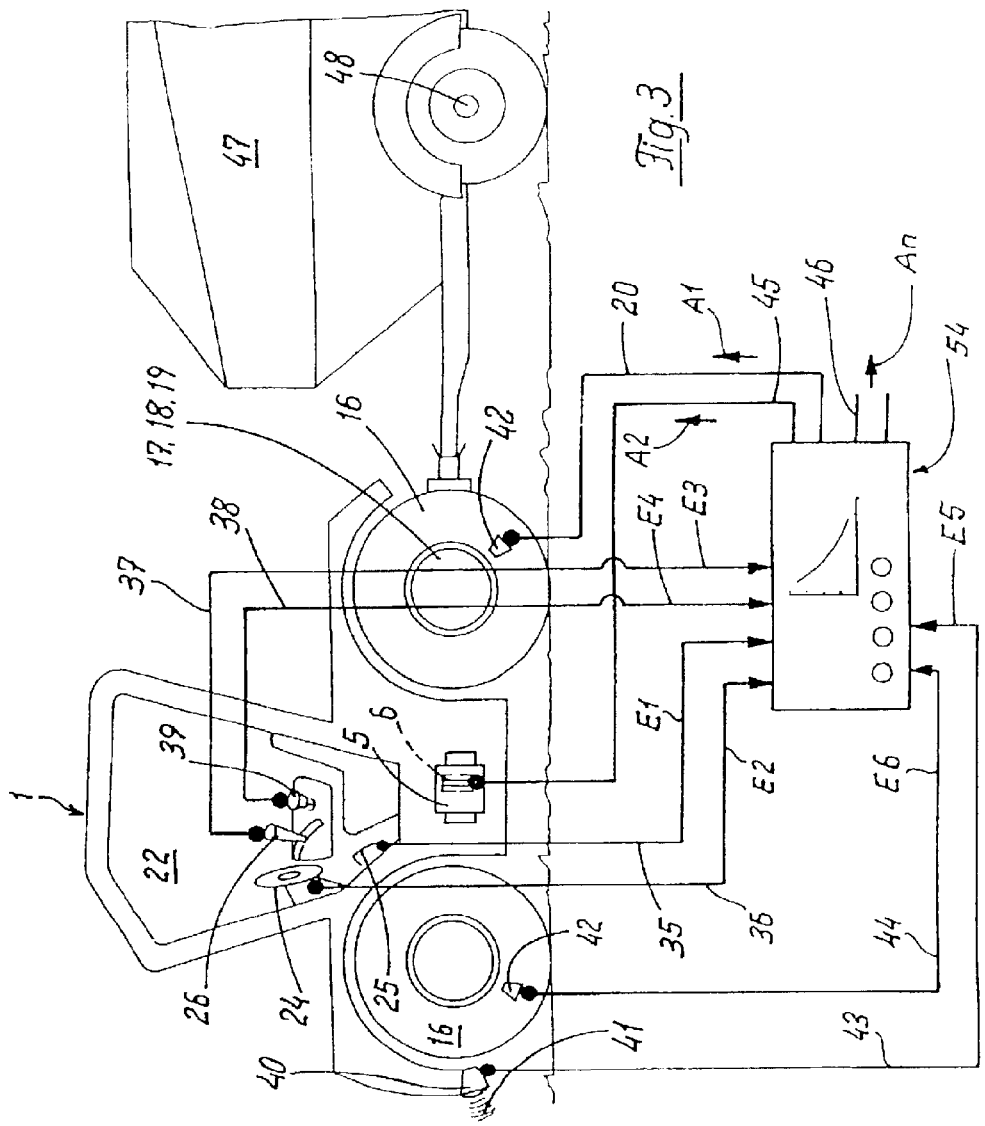
FIG. 3 is a side view of a self-propelled machine with the management controller according to the invention.

As already described and shown in FIG. 3, the wheel brakes 17 of the land wheels 16 are connected by the first signal transmission system 20 to the management controller 21, wherein the management controller 21 receives a plurality of input signals E1–E8 and generates output signals A1–An which act on the one hand on the wheel brakes 17 via the first signal transmission system 20 and on the other hand on the clutch 6 via the second line system. According to FIG. 2, the wheel brakes 17, which can also be designed as hydraulic motors 18 or wheel motors 19 known in the art, and the first signal transmission system 20 connecting them form the machine braking system 53.

As shown in FIGS. 3 and 4, a brake management system 54 includes the machine braking system 53, the elements 24–26, 39, 40, 42, 49, 50 which generate the input signals E1–E8, the management controller 21 and the elements 5, 6, 17–19, with the towed equipment 47, which are influenced by the output signals A1–An thereof as well as the associated signal transmission systems 20, 35–38, 43–46, 51, 52. Such a network makes it possible in a very simple manner to allocate to the driver 23 a plurality of input elements via which he can trigger a braking operation. In such an embodiment, the choice of respective input means can be freely determined by the driver. This is particularly important with self-propelled machines in which a distinction is made between so-called road or transport driving and off-road or working driving. In each of these modes of operation, the driver sometimes actuates very different control elements and his preponderant attention to very different processes must apply, so that triggering of a braking or acceleration operation should also be adaptable to the handling of these different control elements. Such a network additionally allows the configuration of completely new control structures, so that even complex self-propelled machines with, for example, so-called single-lever control or single-pedal control can be represented.

The brake management system 54 may also ensure that the driver 23 can no longer directly influence the braking operation and hence deceleration of the self-propelled machine 1 with the towed equipment 47. Due to the fact that deceleration is directly triggered by the management controller 21, it can be ensured that the clutch 6 is relieved of energy load by applying one or more wheel brakes 17 and much less idle power is generated in the self-propelled machine 1 when reversing the direction of travel.

The simplest application arises if the driver 23 triggers a braking operation by actuation of the brake pedal 25 or presets a change of direction of travel by shifting the ground speed control lever 26. From the input signals E1, E3 delivered to the management controller 21, the latter generates the first output signal A1 ("brake") which is delivered via the first signal transmission system 20 to one or more wheel brakes 17 of the land wheels 16. In the embodiment shown as in FIG. 4, the wheel brake 17 is formed in a manner known in the art and therefore not shown in more detail by an adjustable brake valve 55 and a brake cylinder 57 operatively connected to this brake valve 55 by a hydraulic line system 56. The output signal A1 generated by the management controller 21 first causes displacement of the brake valve 55, as a result of which the brake cylinder 57 brakes the land wheel 16 associated with it. Via at least one of the machine-generated input signals E5 ("speed over land"), E6 ("wheel speed") or E7 ("direction of travel"), the management controller 21 receives information on the instantaneous movement of the self-propelled machine, for example when the self-propelled machine is stationary in case of a desired change of direction of travel, its driving speed is zero.

Also, the management controller 21 generates the second output signal A2 which is transmitted via the second signal transmission system 45 to the clutch 6 of the gearbox 5. Depending on the braking characteristic defined by the management controller 21, the output signal A2 before or during output signal A1 causes the braking operation in the gearbox 5 for opening the clutch 6. At the moment of stopping, the management controller 21 generates a third output signal A3 which is likewise transmitted via the second signal transmission system 45 to the clutch 6. The third output signal A3 triggers a further shift operation in the gearbox 5, namely reengagement of the clutch 6, wherein output signal A1 releases the activated wheel brakes 17 again and the output shaft 7 of the gearbox 5 undergoes a reversal of the direction of rotation and hence the self-propelled machine 1 undergoes a change of direction of travel. Unlike the simplest application described, the clutch 6 of the gearbox 5, in addition to the wheel brakes 17, can likewise be involved in braking the self-propelled machine 1.

To minimize wear on the brake linings, if the driver 23 wishes minimal deceleration, activation of the wheel brakes 17 can be prevented by the management controller 21 by the fact that, for example, the control switch 39 arranged in the operator's platform 22, as already described, generates a signal to engage the engine brake or gearbox brake ("brake via drive train"). In this case the self-propelled machine 1 is decelerated in a manner known in the art and therefore not described in more detail via so-called engine or gearbox brakes.

Driving stability of the self-propelled machine 1 with the towed equipment 47 depends critically on the rideability of the ground over which the land wheels 16 are moving (road, ploughed land), the mass and mass distribution of the self-propelled machine 1 with the towed equipment 47, the driving speed and radii of curvature to be driven through. The brake management system 54 can be used to improve the driving stability of the self-propelled machine 1 and associated towed equipment 47. This is very important particularly for self-propelled and forestry machinery, as machines of this kind are frequently used on uneven land which is difficult to travel over and very slippery due to the action of rain and, depending on the crop being picked up, is subject to great fluctuations of weight.

Due to the fact that the self-propelled machine 1 with the towed equipment 47, in addition to the driver-generated input signals E1–E4, also delivers machine-generated input signals E5–E8 to the management controller 21, the management controller 21 on the one hand is capable of comparing the signals "brake" E1, "steering lock" E2, "direction of travel" E3, "brake via drive train" E4, which are preset by the driver 23, with the variations "speed over land" E5, "wheel speed" E6, "direction of travel" E7, "wheel position" E8, which occur at the self-propelled machine 1 and associated towed equipment 47, and monitoring the attainment thereof. But on the other hand there is also the possibility of permanently programming into the management controller 21 limit values for any parameters in the form of characteristic curves 58 which must not be exceeded to ensure high driving stability. This concerns in particular the maintenance of maximum acceleration and deceleration as a function of the driving speed, the self-propelled machine mass and the radii of curvature to be driven through, wherein interactions between these parameters can also be taken into consideration. Also, by means of the management controller 21 it can be ensured that the deceleration preselected by the driver 23 is transmitted to all land wheels 16 with the towed equipment 47 in such a way that the self-propelled machine 1 and associated towed equipment 47 attains the preselected deceleration, wherein the deceleration of the individual land wheels 16 can differ from each other. This is particularly important if the self-propelled machine 1 is operated with a towed equipment 47 and it is to be ensured that during the braking operation a relative movement does not occur between self-propelled machine 1 and towed equipment 47, or occurs only insignificantly.

Due to the fact that wheel angle sensors 50 and wheel speed sensors 42 for determining the land wheel speed are associated with the land wheels 16 and the associated towed equipment 47, by means of the management controller 21 it can be ensured that the speed of each land wheel 16 is adapted to the steering lock of the respective land wheel 16. In particular this improves the driving stability on bends and turns and leads to less wear on the wheels, because the wheel slip, which is considerable particularly on slippery ground, can easily be counteracted by individual braking of the land wheels 16.

High driving stability and easy handling of the self-propelled machine 1, for example when braking and accelerating, are achieved in particular if the management controller 21 also generates one or more output signals which are delivered to a machine management system 60 known in the art for ensuring stable driving behavior of the self-propelled machine 1 at all times as a function of loading states, driving speeds, the properties of the ground contacted by the land wheels and radii of curvature to be driven through.

It is of particular advantage if the output signals of the management controller 21 delivered to the machine management system 60 include the change of speed of the self-propelled machine 1 and the computer-measured energy of the self-propelled machine 1. In this case, the measured change of speed can be monitored and influenced, for example by means of the machine management system 60, to avoid accelerations or decelerations of the self-propelled machine 1 which might endanger the driving stability. The computer-measured kinetic energy of the self-propelled machine, on the other hand, can be further processed in the machine management system 60, for example to the effect that, in the case of a self-propelled machine 1 on a slope, the brakes are not released until the energy provided by the drive system reliably prevents the self-propelled machine 1 from rolling back.

Also, the management controller 21 can be configured so as to be capable of determining the braking force required to brake the self-propelled machine 1 with the towed equipment 47 and calculating from this braking force the energy needed for subsequent starting. The starting energy determined in this way could be delivered by the management controller 21 as a further output signal A4 by means of a sixth signal transmission system 59 to the machine management system 60 which is known in the art and therefore not described in more detail and in which, depending on at least this signal A4, a starting operation of the self-propelled machine 1 with the towed equipment 47 for stable driving can be ensured.

Figure 5B:
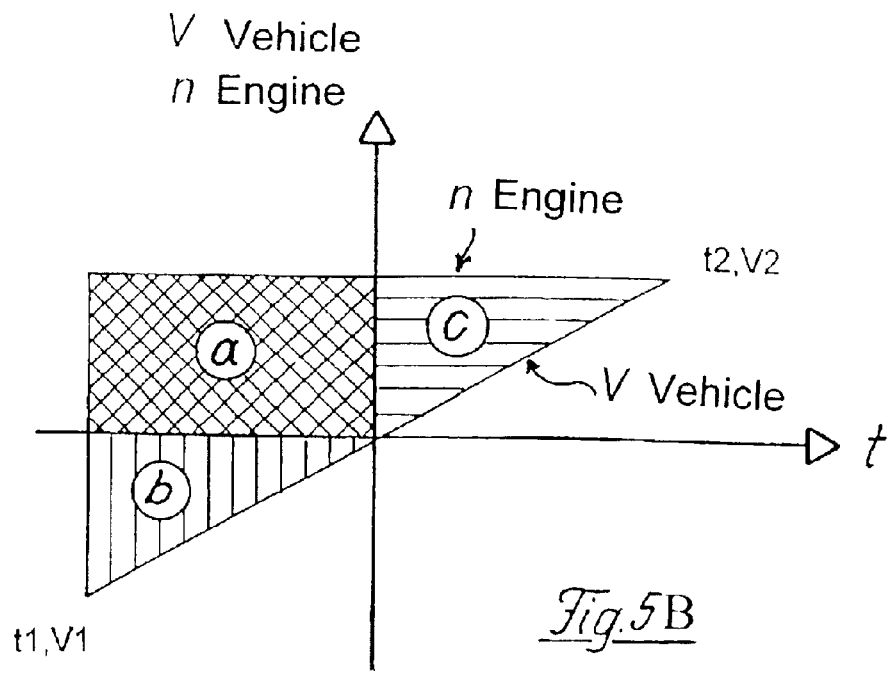
FIGS. 5A and 5B are graphic illustrations comparing energy use.
Figure 5A:
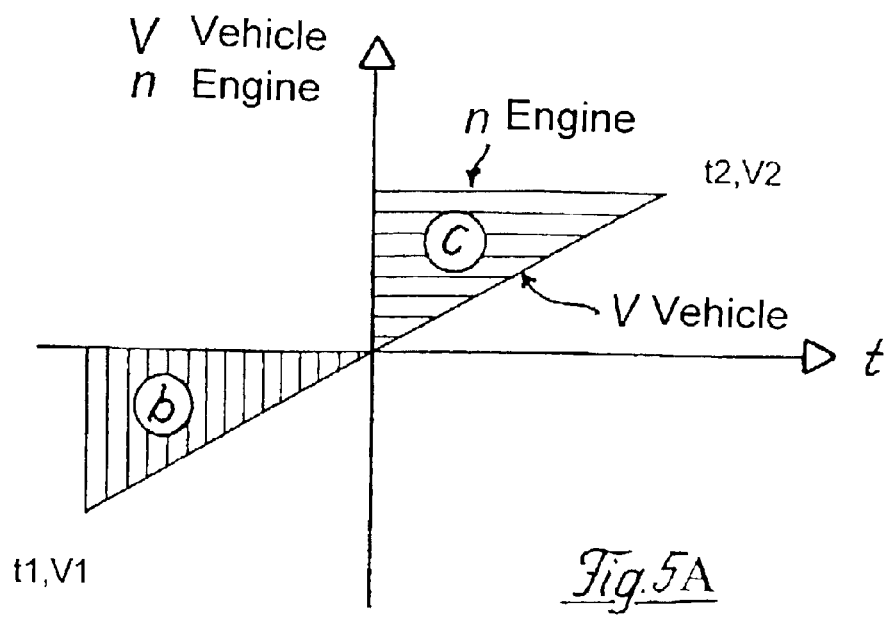

FIG. 5A shows the energy balance when reversing the direction of rotation by means of a reversing gear according to the state of the art. The self-propelled machine 1 travels at moment t1 at a speed of −V1 and brakes through the further time cycle t to a speed of v=0, in order then to be accelerated again, wherein the self-propelled machine 1 finally moves at a speed of V2 at time t2. In simplified form it is assumed here that the engine speed $n_{engine}$ is almost constant during this operation. The area "b" represents the energy quantity which is taken from the self-propelled machine 1 during braking and according to the state of the art occurs in the clutch 6. The area "c" represents the energy quantity of the drive engine 3 which is converted in the clutch 6 by slipping of the clutch 6 during acceleration of the self-propelled machine 1 and cannot be used for machine acceleration.

Referring to FIG. 5B, the area "a" on the other hand embodies the so-called idle power that is introduced into the whole system of the self-propelled machine 1 by the drive engine 3 in the braking stage. Again, area "b" represents the energy quantity which is taken from the self-propelled machine 1 during braking and area "c" represents the energy quantity of the engine 3 which is converted in the clutch 6 by slipping of the clutch 6 during acceleration. The idle power occurs entirely in the clutch 6 and cannot be used for the self-propelled machine. According to the present embodiment, during braking of the self-propelled machine this idle power fraction "a" is decreased by bypassing the clutch 6, and at best this fraction according to FIG. 5A equals zero.

In summary, the method for prolonging the life of a clutch of a self-propelled machine 1 includes the steps of: generating an input signal e.g. E1–E6 relating to a function of the drive train 3–15; analyzing the input signal for its effect on the drive train; generating a plurality of output signals A1–An; transmitting one of the output signals A1 to the machine braking system 53; transmitting another of the output signals A2 to the clutch 6; and automatically cooperatively engaging the machine braking system 53 and disengaging the clutch 6 to assist a change in the speed or direction of rotation of the output shaft 7.

The invention in its broader aspects is not limited to the specific steps and apparatus shown and described but departures may be made therefrom within the scope of the accompanying claims without departing from the principles of the invention and without sacrificing its chief advantages.

What is claimed is:

1. A method for prolonging the life of a clutch of a self-propelled machine having a drive train including a drive engine, a gearbox with an output shaft, and a machine braking system, comprising the steps of:
    generating an input signal relating to a function of the drive train;
    analyzing the input signal for its effect on the drive train;
    generating a plurality of output signals;
    transmitting one of the output signals to the machine braking system;
    transmitting another of the output signals to the clutch; automatically cooperatively engaging the machine braking system and disengaging the clutch to assist a change in the direction of rotation of the gearbox output shaft;
    wherein the self-propelled machine includes a machine management system operatively connected to the management controller, further comprising the steps of:
    determining the braking force required to brake the self-propelled machine through the management controller;
    calculating the energy needed for subsequent starting;
    generating a starting energy output signal; and
    transmitting the starting energy output signal to the machine management system.

2. The method for prolonging the life of a clutch according to claim 1, wherein the driver input is selected from the group consisting of: a steering wheel, a brake pedal, a ground speed control lever, or a control switch.

3. The method for prolonging the life of a clutch according to claim 1, wherein the machine input is selected from the group consisting of: a driving speed sensor, a wheel speed sensor, a direction-of-travel sensor, and a wheel angle sensor.

4. An apparatus for prolonging the life of a clutch of a self-propelled machine having a drive train including an engine, a gearbox with an output shaft, and a machine braking system, comprising:
    a signal receiver configured to receive an input signal relating to a function of the drive train;
    a management controller for receiving the input signal, analyzing the input signal for its effect on the drive train calculating a braking force and a re-start energy, and generating a plurality of output signals; and
    an output circuit configuration transmitting one of the output signals to the machine braking system and another of the output signals to the clutch, and for automatically and cooperatively engaging the machine braking system and disengaging the clutch to assist a change in the speed or direction of rotation of the gearbox output shaft, in accordance with said calculations of braking force and re-start energy.

5. The apparatus for prolonging the life of a clutch according to claim 4, wherein the output signal and the input signal are transmitted by electrical wires.

6. The apparatus for prolonging the life of a clutch according to claim 4, wherein the input signal is generated by a device selected from the group consisting of: a steering wheel sensor, a brake pedal sensor, a ground speed control lever, a control switch, a driving speed sensor, a wheel speed sensor, a direction-of-travel sensor, and a wheel angle sensor.

7. The apparatus for prolonging the life of a clutch according to claim 4, wherein the management controller includes programming to compare the input signal to known characteristic curves and generates the corresponding output signal.

8. The apparatus for prolonging the life of a clutch according to claim 4, wherein the output signal is hydraulically executed.

9. An apparatus for prolonging the life of a clutch of a self-propelled machine having a drive train including an engine, a gearbox with an output shaft, and a machine braking system, comprising:
    means for generating an input signal relating to a function of the drive train;
    a management controller for receiving the input signal, analyzing the input signal for its effect on the drive train, and generating a plurality of output signals;
    means for transmitting one of the output signals to the machine braking system and another of the output signals to the clutch, and for automatically and cooperatively engaging the machine braking system and disengaging the clutch to assist a change in the speed or direction of rotation of the gearbox output shaft,
    the self-propelled machine further including a machine management system, wherein the management controller includes programming to determine braking force required to brake the vehicle and programming to determine the energy needed for subsequent starting, such that the management controller sends to the machine management system the determined energy needed for starting through the means for transmitting the output signal.

10. The method for prolonging the life of a clutch according to claim 9, wherein the driver input is selected from the group consisting of: a steering wheel, a brake pedal, a ground speed control lever, or a control switch.

11. The method for prolonging the life of a clutch according to claim 9, wherein the machine input is selected from the group consisting of: a driving speed sensor, a wheel speed sensor, a direction-of-travel sensor, and a wheel angle sensor.

* * * * *